Figure 1:
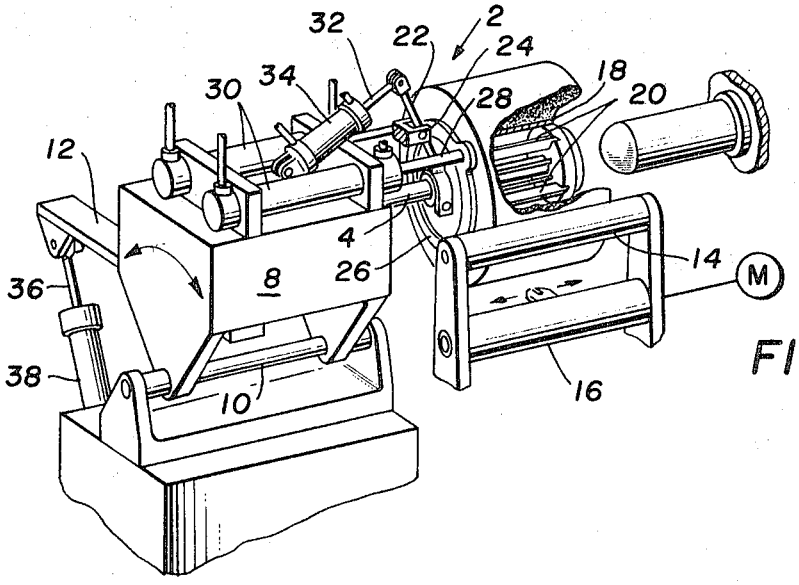
Figure 2:
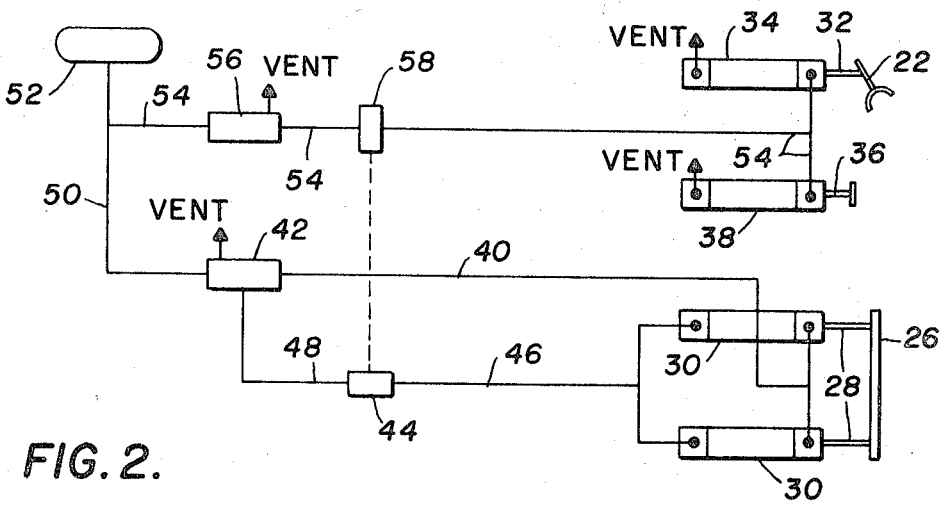
Figure 3:
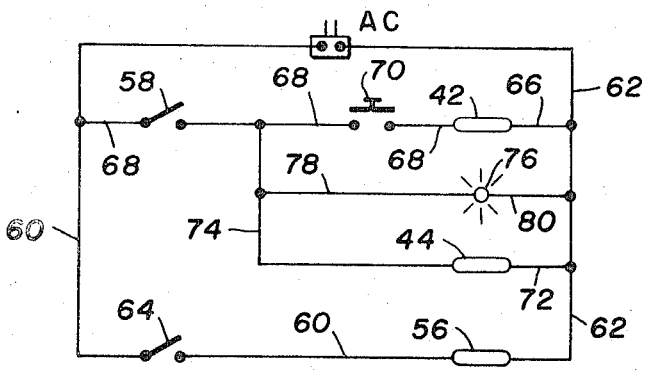

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED MARCH 28, 1972

896 O.G. 1208

T896,049

MODIFIED BOBBIN CHUCK

William D. Decker, 1312 Runnymeade SW; and Andrew P. Carter, Jr., 2008 Nelson St. SE., both of Decatur, Ill. 35601; and Charles R. Lewis, 506 Greendale Drive, Huntsville, Ala. 35806

Filed Sept. 25, 1970, Ser. No. 75,510

Int. Cl. B65h *54/00, 67/04*

U.S. Cl. 242—18 R

1 Sheet Drawing. 7 Pages Specification

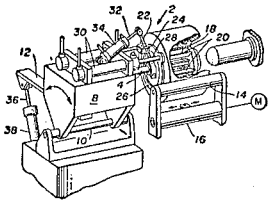

A device for winding packages of textile yarn on a bobbin is provided with electropneumatic means for convenient removal of the bobbin from the winding device. The device includes a driven bobbin chuck having a free-end spindle journalled in a pivotally mounted casing and clutch bars expandable outwardly to hold the bobbin during winding and rotatable to release the bobbin during removal. An annular plate is concentrically mounted about the spindle and is accuated forwardly towards the free end of the spindle to push the bobbin off the chuck during doffing. During winding, the plate is in a retracted position. Electropneumatic means is connected to the plate, the chuck, and the casing, and is operable to remove the bobbin.

March 28, 1972 W. D. DECKER ET AL T896,049

MODIFIED BOBBIN CHUCK

Filed Sept. 25, 1970

PNEUMATIC

ELECTRICAL

INVENTORS
ANDREW P. CARTER, JR.
WILLIAM D. DECKER
CHARLES R. LEWIS